(12) United States Patent
Tsuyuki et al.

(10) Patent No.: US 9,002,625 B2
(45) Date of Patent: Apr. 7, 2015

(54) CONTROL DEVICE FOR INTERNAL COMBUSTION ENGINE EQUIPPED WITH SUPERCHARGER

(75) Inventors: Takeshi Tsuyuki, Hadano (JP); Naozumi Katou, Yokohama (JP); Daisuke Takaki, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 91 days.

(21) Appl. No.: 13/983,903

(22) PCT Filed: Jan. 30, 2012

(86) PCT No.: PCT/JP2012/052023
§ 371 (c)(1),
(2), (4) Date: Aug. 6, 2013

(87) PCT Pub. No.: WO2012/108287
PCT Pub. Date: Aug. 16, 2012

(65) Prior Publication Data
US 2013/0312714 A1    Nov. 28, 2013

(30) Foreign Application Priority Data

Feb. 7, 2011  (JP) ................................. 2011-024144

(51) Int. Cl.
| | |
|---|---|
| *B60T 7/12* | (2006.01) |
| *F02B 33/00* | (2006.01) |
| *F02D 23/00* | (2006.01) |
| *F02D 41/00* | (2006.01) |
| *F02D 41/14* | (2006.01) |
| *F02B 37/00* | (2006.01) |

(52) U.S. Cl.
CPC ................ *F02B 33/00* (2013.01); *F02D 23/00* (2013.01); *F02D 41/0002* (2013.01); *F02D 41/145* (2013.01); *F02D 2200/0406* (2013.01); *Y02T 10/144* (2013.01); *Y02T 10/42* (2013.01); *F02B 37/00* (2013.01)

(58) Field of Classification Search
CPC .................... F02D 41/0072; F02M 2025/0761
USPC ............. 701/108, 114, 103, 104; 123/568.11, 123/568.21, 434, 672, 676, 687, 516, 518
See application file for complete search history.

(56) References Cited

U.S. PATENT DOCUMENTS

| | | | |
|---|---|---|---|
| 2007/0084206 A1* | 4/2007 | Lew et al. ........................ | 60/599 |
| 2008/0077304 A1 | 3/2008 | Suzuki et al. | |
| 2011/0213539 A1* | 9/2011 | Eiraku ........................... | 701/102 |
| 2013/0152584 A1* | 6/2013 | Jankovic et al. ................ | 60/611 |

FOREIGN PATENT DOCUMENTS

| | | |
|---|---|---|
| JP | 09-014023 A | 1/1997 |
| JP | 2002-327650 A | 11/2002 |
| JP | 2005-201086 A | 7/2005 |
| JP | 2006-132351 A | 5/2006 |
| JP | 2006-299992 A | 11/2006 |
| JP | 2008-075549 A | 4/2008 |

* cited by examiner

*Primary Examiner* — John Kwon
(74) *Attorney, Agent, or Firm* — Foley & Lardner LLP

(57) ABSTRACT

Provided is a control device for an internal combustion engine equipped with a supercharger, including: operation state detection means for detecting an operation state of the internal combustion engine; overlap read means for reading a valve overlap period; collector pressure detection means for detecting a collector pressure; exhaust gas pressure estimation means for estimating an exhaust gas pressure on an upstream side of the supercharger; and scavenging amount estimation means for estimating a scavenging amount based on the operation state, the valve overlap period, the collector pressure, and the exhaust gas pressure.

5 Claims, 9 Drawing Sheets

CONTROL DEVICE FOR INTERNAL COMBUSTION ENGINE EQUIPPED WITH SUPERCHARGER

TECHNICAL FIELD

This invention relates to calculation for estimating a scavenging amount of an internal combustion engine.

BACKGROUND ART

A fuel injection amount of an internal combustion engine is set based on an intake air amount. However, during the so-called valve overlap period in which both of an intake valve and an exhaust valve are open, a part of the intake air which has passed through an intake passage may pass through a cylinder, and flows out to an exhaust passage. Thus, when the fuel injection amount is set based only on the intake air amount passing through the intake passage, the air/fuel ratio in the cylinder shifts toward a rich side by an amount corresponding to a scavenging amount, which is an amount of the air flowing out to the exhaust passage. As a result, the accuracy of air/fuel ratio control and the like decreases.

Therefore, it is necessary to estimate the scavenging amount, thereby setting a fuel injection amount based on the air amount actually existing in the cylinder. As a technology for estimating the scavenging amount, a method involving using an engine rotation speed, a valve overlap amount, and a supercharged pressure is disclosed in JP 2006-299992 A.

SUMMARY OF INVENTION

By the way, in a case of an internal combustion engine equipped with a supercharger, in order to enhance an estimation accuracy of the scavenging amount, an exhaust gas pressure needs to be considered in addition to the supercharged pressure. This is because the exhaust gas pressure before the turbine varies depending on whether or not the turbine rotation speed of the supercharger has reached an equilibrium state in terms of a gas flow amount flowing through the exhaust passage. For example, in a transient state where the turbine rotation speed increases, the turbine becomes a resistance in a process of an increase in gas flow amount, and the exhaust gas pressure is thus higher than the exhaust gas pressure with the same intake air amount and the same engine rotation speed as those in the steady state. However, JP 2006-299992 A does not mention the exhaust gas pressure.

Moreover, the pressure of the intake air can be generally acquired based on a detected value obtained by an intake air pressure sensor, or air flow sensor, but an exhaust gas pressure sensor is rarely used, and there poses a problem in that addition of the exhaust gas pressure sensor increases the cost.

Therefore, it is an object of this invention to enhance the accuracy of estimating the scavenging amount of an internal combustion engine equipped with a supercharger without increasing a cost.

A detailed description of this invention as well as other features and advantages thereof is given in the following description of the specification, and is also illustrated in the accompanying drawings.

DESCRIPTION OF EMBODIMENTS

First Embodiment

Figure 1:
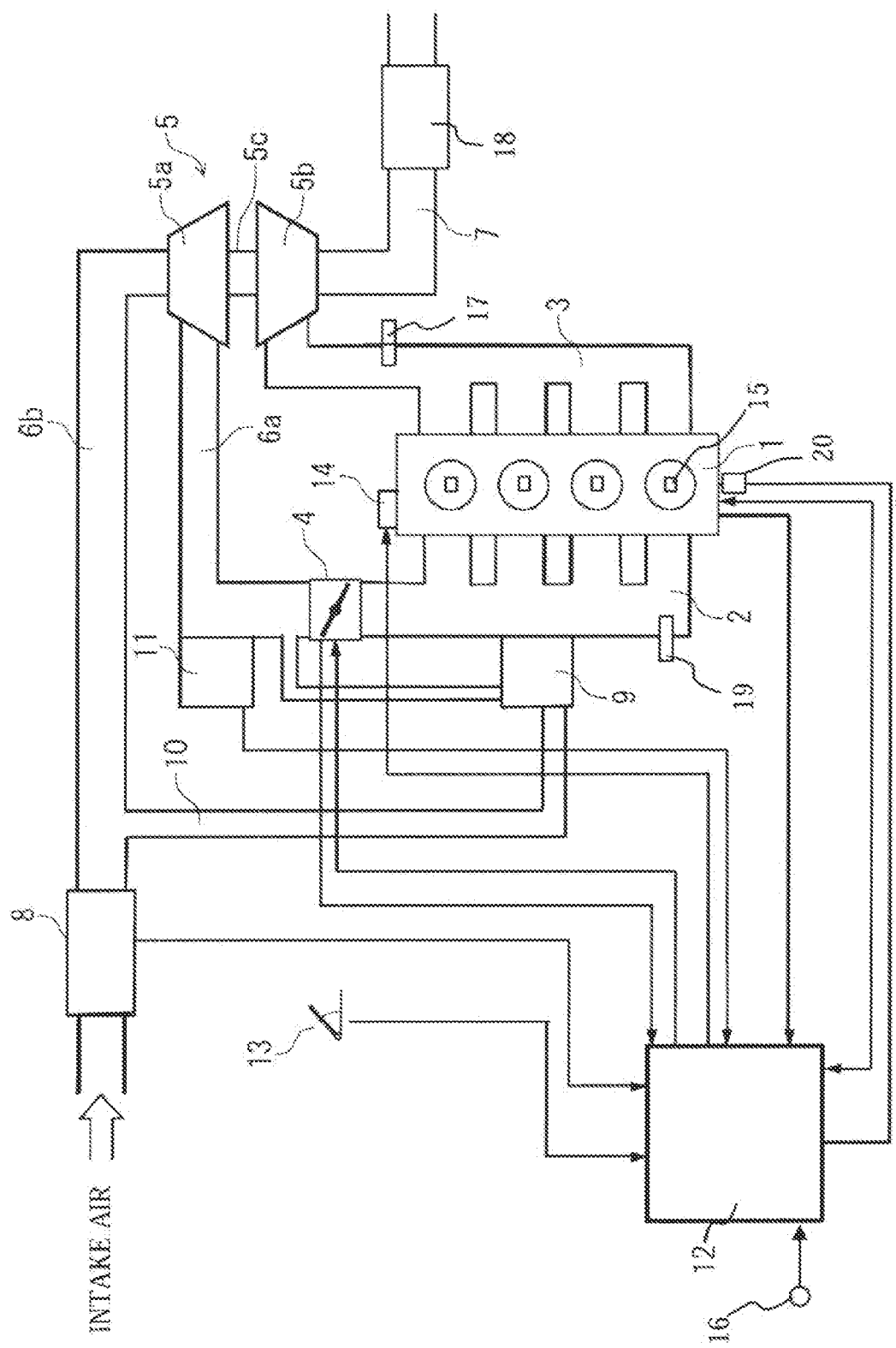
FIG. 1 is a configuration diagram of a system to which a first embodiment is applied.

FIG. 1 is a system configuration diagram of an internal combustion engine to which an embodiment of this invention is applied.

At an inlet of an intake manifold 2 of an internal combustion engine 1, a throttle valve 4 for adjusting an air amount flowing into the internal combustion engine 1 is provided, and an intake passage 6 is connected upstream thereof. On an upstream side of the throttle valve 4 of the intake passage 6, a compressor 5a of a supercharger 5 is provided, and an air flow meter 8 for detecting an intake air amount is provided further upstream thereof.

In each of the cylinders of the internal combustion engine 1, a fuel injection valve 15 for directly injecting a fuel into the cylinder is provided. In the exhaust passage 7, a turbine 5b of the supercharger 5 is provided.

The supercharger 5 is a so-called turbocharger, and the compressor 5a and the turbine 5b are connected through an intermediation of a shaft 5c. As a result, when the turbine 5b is rotated by exhaust energy of the internal combustion engine 1, the compressor 5a also rotates, thereby pressure-feeding the intake air to the downstream side.

On the downstream side of the turbine 5b, an exhaust gas catalyst 18 for purifying the exhaust gas is provided. As the exhaust gas catalyst 18, a three-way catalyst or the like is used.

A recirculation passage 10 is a passage for connecting an intake passage 6a and an intake passage (hereinafter referred to as intake passage 6b) which is on a downstream side of the air flow meter 8 and on an upstream side of the compressor 5a, and when a recirculation valve 9 provided on the way opens, both the intake passages 6a and 6b communicate to each other, and when the recirculation valve 9 closes, the communication is shut off.

As in a generally known recirculation valve, the recirculation valve 9 opens when a differential pressure between a supercharged pressure and a pressure (hereinafter referred to as intake pipe pressure) in the intake manifold 2 reaches a value equal to or more than a predetermined value. For example, against a valve body provided inside, a reaction force of a built-in spring is biased toward a valve closing direction and further, the supercharged pressure acts in a valve opening direction and the intake pipe pressure acts in the valve closing direction. Then, when the differential pressure between the supercharged pressure and the intake pipe pressure exceeds the reaction force of the spring, the valve opens. As a result, when the throttle valve 4 is fully opened during a travel in a supercharged state, the supercharged pressure is prevented from excessively increasing. The differential pressure between the supercharged pressure and the intake pipe pressure when the recirculation valve 9 opens may be set to an arbitrary value by a spring constant of the spring.

A valve timing control mechanism 14 only needs to change an intake valve closing (IVC) timing so that the overlap period in which both the exhaust valve and the intake valve are opened is generated. For example, a generally known valve timing control mechanism such as one which changes a rotation phase of an intake cam shaft with respect to a crankshaft or one which changes an operation angle of an intake valve can be used. It should be noted that a similar valve timing control mechanism 14 may be provided on the exhaust valve side, thereby variably controlling the valve timings of the intake valve and the exhaust valve.

It should be noted that a control unit 12 reads parameters relating to operation states such as the intake air amount detected by the air flow meter 8, an accelerator opening detected by an accelerator opening degree sensor 13, and the engine rotation speed detected by a crank angle sensor 20, and controls an ignition timing, a valve timing, an air/fuel ratio, and the like based on those parameters.

When the pressure in the intake manifold 2 is higher than the pressure in the exhaust manifold 3, the control unit 12 activates the valve timing control mechanism 14 so as to provide a valve timing for generating a valve overlap period in which the intake valve and the exhaust valve are opened.

Figure 9:
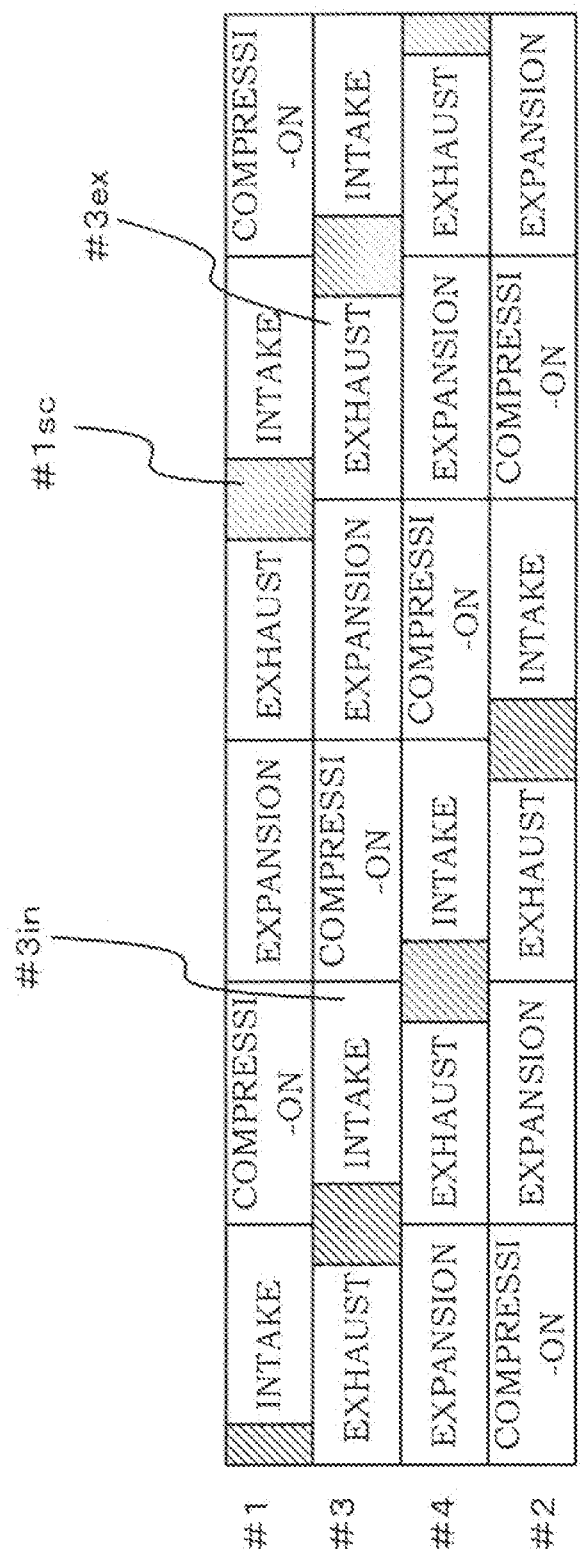
FIG. 9 is a diagram illustrating a stroke sequence of an inline four-cylinder internal combustion engine.

The activation is carried out so as to use a so-called scavenging effect in which new air flowing into the intake manifold 2 serves as scavenging gas and directly flows to the exhaust manifold 3 during the valve overlap period to increase the rotation speed of the turbine 5b, thereby enhancing a charging efficiency in the cylinder Referring to FIG. 9, a specific description is now given of the effect. FIG. 9 illustrates a stroke sequence of an inline four-cylinder internal combustion engine having an ignition sequence of a first cylinder, a third cylinder, a fourth cylinder, and a second cylinder. Hatched portions in the figure represent the valve overlap periods.

When the valve overlap period is provided, in the exhaust manifold 3, the exhaust gas exhausted from a cylinder in the exhaust stroke and the scavenging gas in another cylinder in the intake stroke on this occasion merge. For example, the exhaust gas exhausted in an exhaust stroke #3ex of the third cylinder of FIG. 9 and the scavenging gas scavenged in a valve overlap period #1sc of the first cylinder in the intake stroke on this occasion merge.

As a result, compared with a case where the valve overlap period is not provided, in other words, the scavenging is not carried out, the gas amount introduced into the turbine 5b increases. As a result, the rotation speed of the turbine 5b increases, and the supercharged pressure provided by the compressor 5a increases. Moreover, the scavenging discharges a residual gas in the cylinder along with the new air gas, and as a result, the charging efficiency of the new air in the cylinder is enhanced.

Further, according to this embodiment, air/fuel ratio control, which is described later, combusts the mixture of the exhaust gas and the scavenging gas merging in the exhaust manifold 3 before the mixture flows into the turbine 5b, thereby further increasing the energy for rotating the turbine 5b.

As a result, the fuel injection amount is set so that the mixture of the exhaust gas exhausted during the exhaust stroke from a certain cylinder and the scavenging gas scavenged during the valve overlap period from a cylinder which is in the intake stroke in the same period provides an air/fuel ratio facilitating the combustion before the mixture flows into the turbine 5b. In other words, the fuel injection amount is set so that the air/fuel ratio in the cylinder is set to an air/fuel ratio richer than the theoretical air fuel ratio, the exhaust gas containing unburnt hydrocarbon is exhausted, and the exhaust gas and the scavenging gas are mixed, which results in an air/fuel ratio facilitating the combustion, for example, the theoretical air/fuel ratio.

For example, a fuel injection amount corresponding to an air amount taken in in an intake stroke #3in of the third cylinder of FIG. 9 is set so that an air/fuel ratio facilitates the combustion of a mixture of an exhaust gas exhausted in an exhaust stroke #3ex of the third cylinder and an scavenging gas exhausted in a valve overlap period #1sc of the first cylinder. In other words, when the air/fuel ratio in the third cylinder is focused on, the air/fuel ratio is richer than the theoretical air/fuel ratio, and the exhaust gas containing the unburnt fuel is exhausted in the exhaust stroke.

The fuel injection amount set as described above is entirely injected by a single fuel injection per stroke. The fuel injection period is set after the end of the valve overlap period in the intake stroke, namely, after the exhaust valve is closed, or in the compression stroke. It should be noted that the air/fuel ratio control is described in detail later.

When the injection is carried out in this way, the fuel which serves as the unburnt hydrocarbon in the exhaust gas receives combustion heat in the expansion stroke, and changes from higher hydrocarbons long in carbon chain to lower hydrocarbons shorter in carbon chain, which results in a higher combustion property. Moreover, the air/fuel ratio in the cylinder becomes richer than the theoretical air/fuel ratio so that the air/fuel ratio comes closer to the power air/fuel ratio, and hence the output can increase compared with the case of the operation at the theoretical air/fuel ratio. Further, the inside of the cylinder is cooled by the latent heat of vaporization when the fuel vaporizes in the cylinder, which contributes to an enhancement of the charging efficiency.

Figure 2:
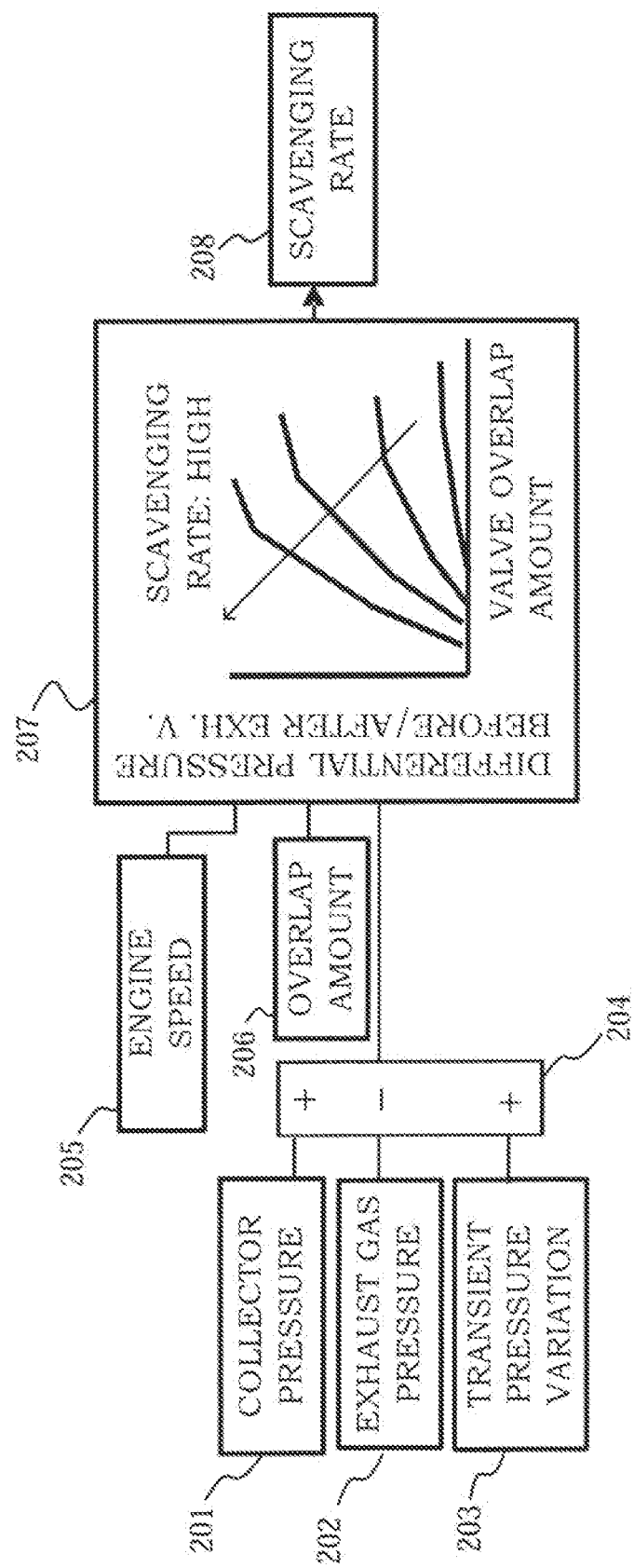
FIG. 2 is a block diagram illustrating details of calculation for acquiring a scavenging rate carried out by a control unit according to the first embodiment.

FIG. 2 is a block diagram illustrating details of calculation for acquiring a scavenging rate.

During the steady state operation, the scavenging rate is determined based on the engine rotation speed, a heat generation amount determined by the intake air amount, and a gas amount passing through the exhaust manifold 3. However, an increase in the rotation speed of the turbine 5b delays with respect to an increased speed of the gas amount flowing through the exhaust manifold 3 during a transient operation, which results in a pressure loss. As a result, the exhaust gas pressure during the transient operation is higher than an exhaust gas pressure during the steady operation with the same intake air amount and the same engine rotation speed. Thus, the calculation of FIG. 2 calculates the scavenging rate by correcting the exhaust gas pressure during the steady state operation by an increase/decrease of an exhaust gas pressure variation amount (hereinafter referred to as transient-exhaust-gas-pressure-variation amount) during the transient operation. As a result, an estimation accuracy of the scavenging rate can be enhanced.

It should be noted that, in the steady operation state, the calculation of the transient-exhaust-gas-pressure-variation amount is not necessary.

A collector pressure read module 201 reads the pressure in the intake manifold 2, namely, the detected value obtained by the intake air pressure sensor 19 as a collector pressure. An exhaust gas pressure read module 202 reads an exhaust gas pressure acquired by calculation to be described later. A transient-exhaust-gas-pressure-variation read module 203 reads a transient-exhaust-gas-pressure-variation amount acquired by calculation to be described later.

A differential-pressure-before/after-exhaust-valve calculation module 204 subtracts the exhaust gas pressure from the collector pressure, and adds the transient exhaust gas pressure variation thereto, thereby calculating a differential pressure before/after exhaust valve. As a result, the differential pressure before/after exhaust valve containing the transient-exhaust-gas-pressure-variation amount is calculated.

On the other hand, an engine rotation speed read module 205 reads the engine rotation speed based on a detected value obtained by the crank angle sensor 20, and an overlap amount read module 206 reads a valve overlap amount acquired by calculation to be described later.

Then, a scavenging rate calculation module 207 acquires the scavenging rate by using a map set in advance based on the engine rotation speed, the valve overlap amount, and the differential pressure before/after exhaust valve, and a scavenging rate setting module 208 reads the calculation result as the scavenging rate. As illustrated in FIG. 2, the map used on this occasion has a vertical axis representing the differential pressure before/after exhaust valve, and a horizontal axis representing the valve overlap amount, and the control unit 12 stores a plurality of the maps for respective engine rotation speeds.

A description is now given of calculation methods for the exhaust gas pressure, the transient exhaust gas pressure variation, the valve overlap amount, and the like.

Figure 3:
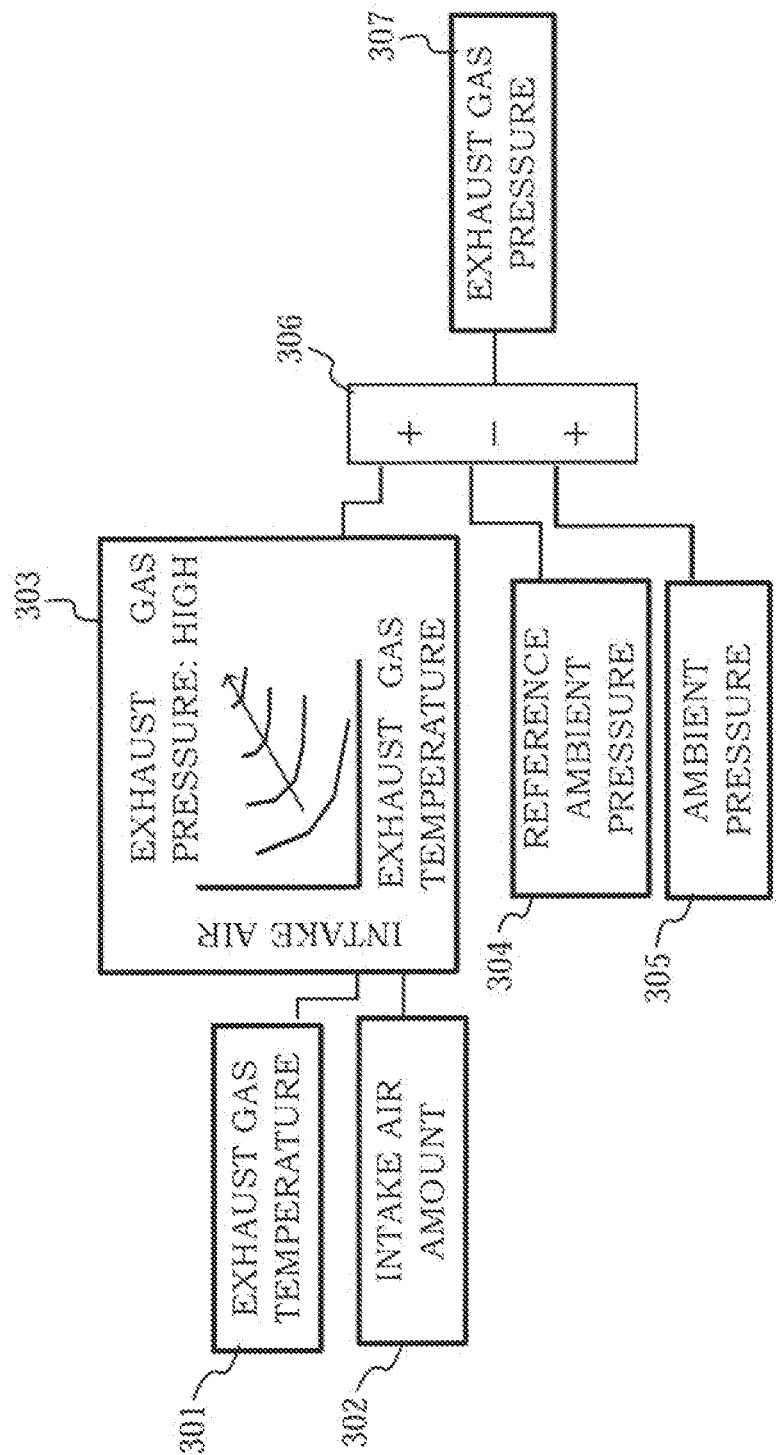
FIG. 3 is a block diagram illustrating details of calculation for acquiring an exhaust gas pressure carried out by the control unit according to the first embodiment.

FIG. 3 is a block diagram illustrating details of calculation for acquiring the exhaust gas pressure read by the exhaust gas pressure read module 202. The exhaust gas pressure is greatly influenced by the ambient pressure and the exhaust gas temperature, and hence, by carrying out a correction based thereon, an estimation accuracy of the exhaust gas pressure can be enhanced, and further, the estimation accuracy of the scavenging rate can also be enhanced. Moreover, by acquiring the exhaust gas pressure by the calculation, an exhaust gas pressure sensor does not need to be provided, thereby eliminating an increase in cost for adding the sensor. Specifically, the following calculation is carried out.

An exhaust gas temperature read module 301 reads the detected value obtained by the exhaust gas temperature sensor 17, and an intake air amount read module 302 reads the detected value obtained by the air flow meter 8. A reference exhaust gas pressure calculation module 303 calculates, based on the read values, an exhaust gas pressure serving as a reference by using a map generated in advance. As a result, the exhaust gas pressure based on the intake air amount and the exhaust gas temperature can be used as the reference value.

On the other hand, a reference ambient pressure read module 304 reads a detected value obtained by the ambient pressure sensor 16 when the reference exhaust gas pressure is calculated. Further, an ambient pressure read module 305 reads a current detected value obtained by the ambient pressure sensor 16. Then, an ambient pressure correction module 306 calculates a sum of a value acquired by subtracting the reference ambient pressure from the reference exhaust gas pressure and the ambient pressure, and an exhaust gas pressure calculation module 307 reads the calculation result as the exhaust gas pressure. As a result, the exhaust gas pressure based on the ambient pressure can be estimated.

Figure 4:
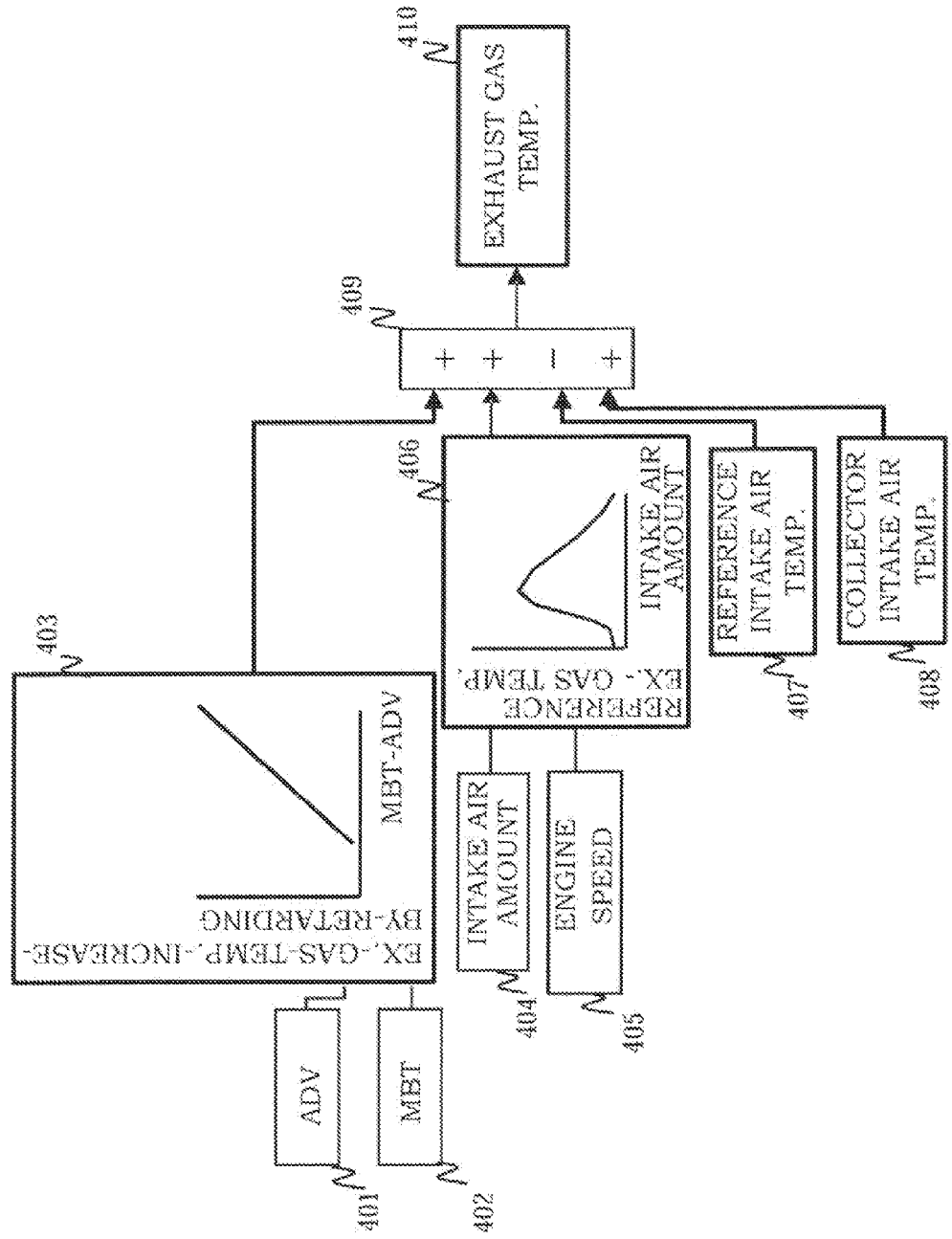
FIG. 4 is a block diagram illustrating details of calculation for acquiring an exhaust gas temperature carried out by the control unit according to the first embodiment.

FIG. 4 is a block diagram illustrating details of calculation for calculating the exhaust gas temperature read by the exhaust gas temperature read module 301 of FIG. 3.

An ignition timing read module 401 and an optimal ignition timing read module 402 respectively read an ignition timing ADV and an optimal ignition timing MBT. Then, an exhaust-gas-temperature-increase-by-retarding calculation module 403 calculates a retarded amount which is a difference between the optimal ignition timing MBT and the ignition timing ADV, and uses a map generated in advance to calculate an exhaust gas temperature increase amount by retarding which is an increased amount of the exhaust gas temperature caused by an ignition timing retarding.

On the other hand, an intake air read module 404 and an engine rotation speed read module 405 respectively read the intake air amount and the engine rotation speed, and a reference exhaust gas temperature calculation module 406 searches a map generated in advance for each engine rotation speed by using the intake air amount, thereby calculating a reference exhaust gas temperature. The reference exhaust gas temperature is an exhaust gas temperature determined only from the relationship between the intake air amount and the engine rotation speed, without including an influence from the ignition timing retarding, the temperature of the intake air, and the like.

A reference intake air temperature read module 407 reads a reference intake air temperature which is a temperature of intake air while passing through the air flow meter 8, and a collector intake air read module 408 reads a collector intake air temperature which is a temperature in the intake manifold 2. The collector intake air temperature may be detected by providing a temperature sensor, or may be estimated by calculation from the intake air amount, the supercharged pressure, and the like.

An exhaust gas temperature correction module 409 corrects the reference exhaust gas temperature by using a difference between the reference intake air temperature and the collector intake air temperature, and by further using the exhaust gas temperature increase amount by retarding. Then, the result is stored as the exhaust gas temperature in an exhaust gas temperature setting module 410.

Figure 5:
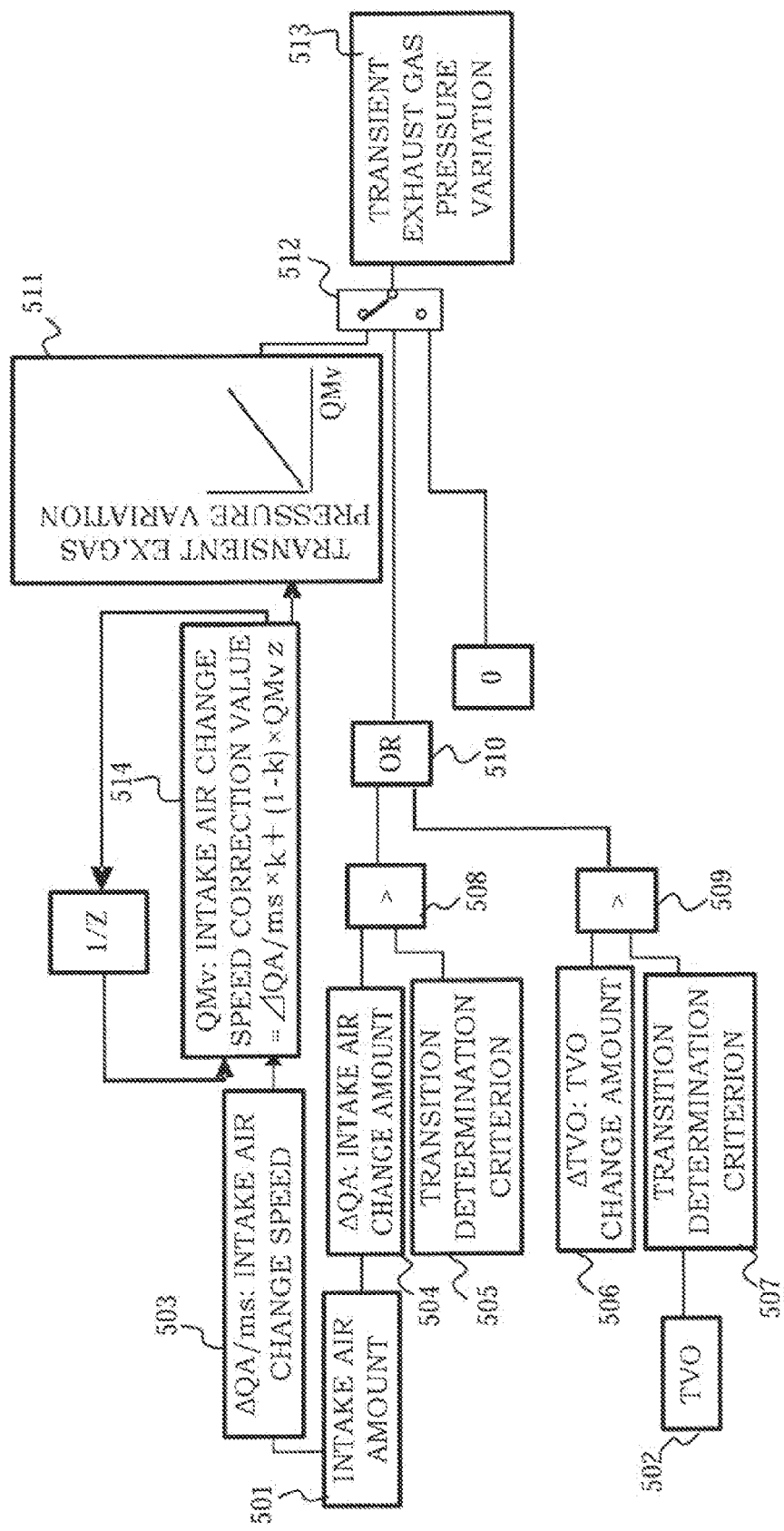
FIG. 5 is a block diagram illustrating details of calculation for acquiring a transient exhaust gas pressure variation carried out by the control unit according to the first embodiment.

FIG. 5 is a block diagram for calculating the transient-exhaust-gas-pressure-variation amount read by the transient-exhaust-gas-pressure-variation read module.

On this occasion, by using change amounts of the intake air amount and the throttle valve opening, the transient-exhaust-gas-pressure-variation amount is calculated.

An intake air amount read module 501 reads a detected value obtained by the air flow meter 8. A throttle valve opening read module 502 reads the throttle opening. The throttle valve opening may be detected by a throttle position sensor, or, for an electronically controlled throttle, an instruction value directed to an actuator for driving the throttle valve may be read.

An intake air change speed calculation module 503 calculates, based on the intake air amount read by the intake air amount read module 501, an intake air change speed $\Delta QA/ms$ which is a change speed of the intake air amount per millisecond. Whether the supercharger 5 is in the transient state or the steady state is determined by the change amount of the intake air amount, and, by using the intake air change speed ΔQA/ms calculated by using the measured intake air amount, the transient exhaust gas pressure variation can be accurately estimated.

An intake air change speed correction value calculation module 514 calculates a value obtained by imparting a first order delay to the intake air change speed ΔQA/ms by using the following equation (1) as an intake air change speed correction value QMv.

$$QMv=(\Delta QA/ms)\times k+(1-k)\times QMVz \qquad (1)$$

A transient-exhaust-gas-pressure-variation amount estimation module 511 calculates, based on the intake air change speed correction value QMv acquired as described above, a transient-exhaust-gas-pressure-variation amount serving as a reference by using a map generated in advance, and inputs the calculation result to a switch module 512.

An intake-air-amount change amount calculation module 504 calculates a change amount of the intake air amount, and a first determination module 508 compares a first transient determination criterion stored in advance in a first transient determination criterion setting module 505 and the intake-air-amount change amount with each other.

A throttle-valve-opening change amount calculation module 506 calculates a change amount of the throttle valve opening, and a second determination module 509 compares a second transient determination criterion stored in advance in a second transient determination criterion setting module 507 and the throttle-valve-opening change amount with each other.

A third determination module 510 reads determination results of the first determination module 508 and the second determination module 509. Then, when at least one of a determination that the intake-air-amount change amount is larger than the first transient determination criterion in the first determination module 508 and a determination that the throttle-valve-opening change amount is larger than the second transient determination criterion in the second determination module 509 is made, the third determination module 510 determines that the operation state is a transient operation state. The determination result is input to the switch module 512, and when the operation state is a transient operation state, the switch module 512 switches to a side of adding the transient exhaust gas pressure variation, and when the operation state is not a transient operation state, the switch module 512 switches to a side of not adding the transient-exhaust-gas-pressure-variation amount. A transient-exhaust-gas-pressure-variation determination module 513 sets the value output from the switch module 512 as the transient-exhaust-gas-pressure-variation amount.

Figure 6:
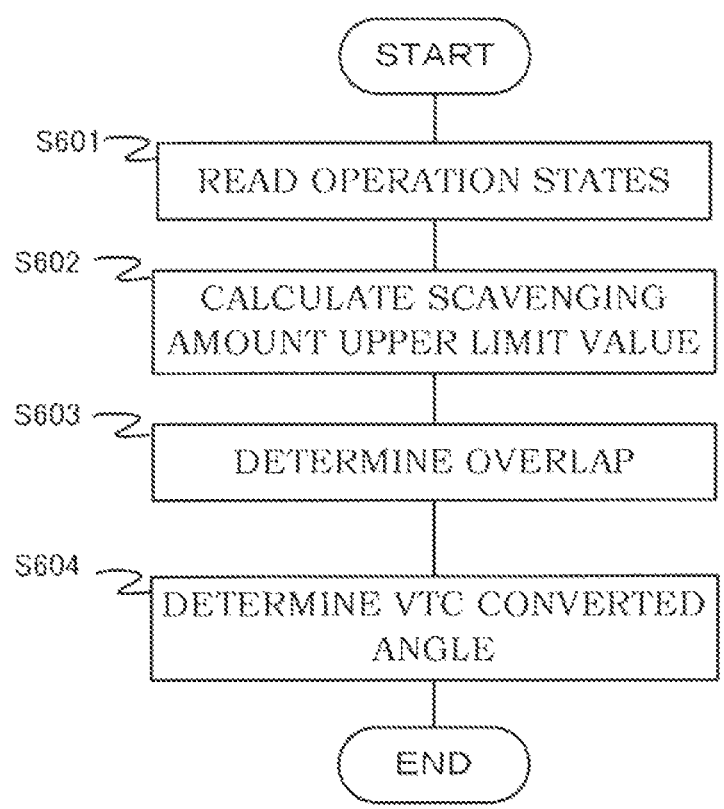
FIG. 6 is a block diagram illustrating details of calculation for determining a converted angle for a valve timing control mechanism carried out by the control unit according to the first embodiment.

FIG. 6 is a flowchart illustrating a control routine for determining a converted angle for the valve timing control mechanism 14 carried out by the control unit 12. In the course of the control, the valve overlap period is calculated.

In Step S601, the control unit 12 reads operation states of the internal combustion engine 1 such as the collector pressure, the engine rotation speed, the intake air temperature, the ambient pressure, and a basic injection pulse.

In Step S602, the control unit 12 calculates a scavenging amount upper limit value determined from the operation states. A description is now given of an example of how to acquire the scavenging amount upper limit value.

Figure 7:
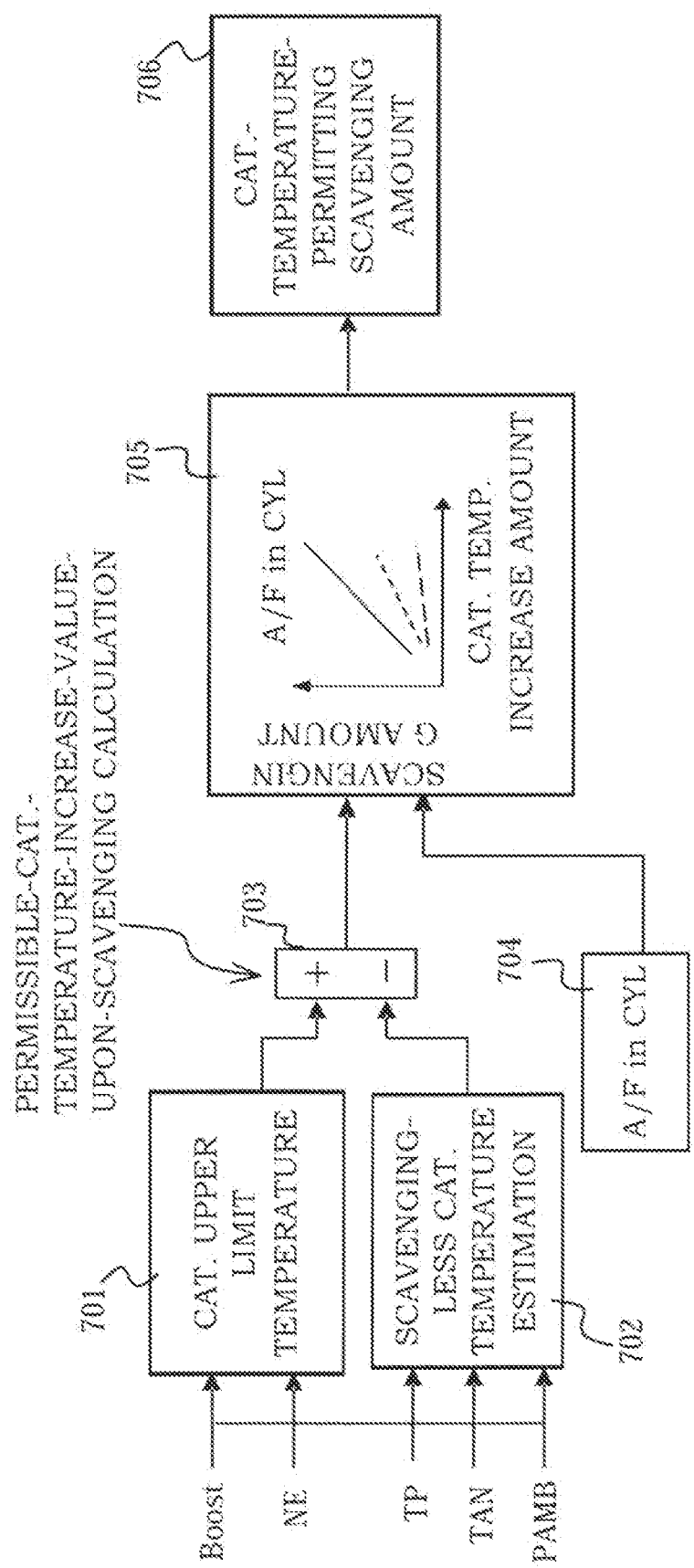
FIG. 7 is a block diagram for calculating a scavenging amount upper limit value based on a catalyst temperature carried out by the control unit according to the first embodiment.

FIG. 7 is a block diagram for calculating the scavenging amount upper limit value based on a catalyst temperature.

When the fuel is injected so that the air/fuel ratio in the exhaust manifold 3 including the scavenged portion is the theoretical air/fuel ratio, thereby combusting the mixture of the exhaust gas and the scavenging gas in the exhaust manifold 3, the temperature of the exhaust gas catalyst 18 by the combustion can increase more as the scavenging amount increases. The exhaust gas catalyst 18 degrades in an exhaust gas purification capability when the temperature excessively increases, and hence the upper limit for the scavenging amount is set to restrain the temperature increase of the exhaust gas catalyst 18.

It should be noted that, as the operation states, the collector pressure Boost, the engine rotation speed NE, a basic injection pulse TP, the intake air temperature TAN, and the ambient pressure PAMB are read.

A catalyst upper limit temperature calculation module 701 calculates a catalyst upper limit temperature which is an upper limit temperature of the exhaust gas catalyst 18 determined by the operation states. Similarly, a scavenging-less catalyst upper limit temperature calculation module 702 calculates a scavenging-less catalyst estimated temperature which is an estimated temperature of the exhaust gas catalyst 18 in an operation state without the scavenging, namely, an operation state where the mixture of the scavenging gas and the exhaust gas is not combusted.

A permissible-catalyst-temperature-increase-value-upon-scavenging calculation module 703 calculates a permissible catalyst temperature increase value upon scavenging, which is a difference between the catalyst upper limit temperature and the scavenging-less catalyst estimated temperature. An increase in temperature of the exhaust gas catalyst 18 upon the scavenging can be permitted by an amount corresponding to the permissible catalyst temperature increase value upon scavenging.

A catalyst-temperature-permitting scavenging amount calculation module 705 calculates, based on the permissible catalyst temperature increase value upon scavenging and the air/fuel ratio in the cylinder of the internal combustion engine 1 acquired by a cylinder internal air/fuel ratio calculation module 704, by using a map generated in advance, a catalyst-temperature-permitting scavenging amount which is a scavenging amount upper limit value determined by the temperature of the exhaust gas catalyst 18. The map used on this occasion is a map representing a relationship between the scavenging amount and a catalyst temperature increase amount for each cylinder internal air/fuel ratio.

Then, a catalyst-temperature-permitting scavenging amount determination module 706 sets the calculated result as a catalyst-temperature-permitting scavenging amount.

A description is given referring back to FIG. 6.

In Step S603 of FIG. 6, the control unit 12 determines a valve overlap period based on the scavenging amount acquired in Step S602. When a relationship between the scavenging amount and the valve overlap period is acquired in advance based on specifications of an internal combustion engine subject to the application, the valve overlap period can be easily set based on the scavenging amount. In Step S604, the control unit 12 determines, in order to realize the valve overlap period determined in Step S603, the converted angle of the valve timing control mechanism 14. When a relationship between the valve overlap period and the converted angle is acquired in advance based on profiles and the like of the intake cam and the exhaust cam of the internal combustion engine 1 subject to the application, the converted angle can be easily determined based on the valve overlap period.

The overlap amount read module 206 of FIG. 2 reads this value.

By acquiring the exhaust gas pressure, the transient exhaust gas pressure variation, and the valve overlap amount through the above-mentioned calculations, and then carrying out the calculations of FIG. 2 by using those values, the scavenging rate to which the influence of the exhaust gas pressure is added is acquired.

As a result, this embodiment provides the following effects.

The control unit 12 estimates the scavenging amount based on the engine rotation speed, the valve overlap period, the collector pressure, and the exhaust gas pressure, and hence regardless of whether the turbine rotation speed is in the equilibrium state in terms of the gas flow amount or the turbine rotation speed is increasing, the scavenging rate can be accurately estimated.

The control unit 12 estimates the exhaust gas pressure in the steady operation state based on the operation states of the internal combustion engine 1, thereby estimating the exhaust-gas-pressure-change amount in the transient operation state based on the action state of the supercharger 5. Then, by correcting the estimated exhaust gas pressure value in the steady operation state by the estimated exhaust-gas-pressure-change amount value in the transient operation state, the exhaust gas pressure is estimated. In other words, the exhaust gas pressure in the steady operation state determined by the operation states such as the engine rotation speed is corrected by the exhaust gas pressure incremental/decremental amount in the transient operation state determined by the action state of the supercharger 5 such as the intake air change speed, and hence the scavenging rate can be highly accurately estimated.

The control unit 12 uses, as the action state of the supercharger 5, the change speed of the air amount passing through the intake manifold 2. Whether the supercharger 5 is in the equilibrium state or the transient state is determined by the air amount passing through the compressor 5a of the supercharger 5. Therefore, by using the change speed of the air amount passing through the intake manifold 2, which is the above-mentioned air amount itself, the action state of the supercharger 5 can be properly recognized.

The control unit 12 uses, as parameters for estimating the exhaust gas pressure in the steady state, at least the exhaust gas temperature and the ambient pressure, and hence the control unit 12 can estimate the exhaust gas pressure without using the exhaust gas pressure sensor.

The control unit 12 estimates the exhaust gas temperature based on the operation states of the internal combustion engine 1, and estimates the exhaust gas pressure in the steady operation state based on the estimated exhaust gas temperature value, and hence the control unit 12 can accurately estimate the exhaust gas temperature determined by the operation states of the internal combustion engine 1.

The control unit 12 uses an ignition timing retarded amount as one of the parameters representing the operation states in order to estimate the exhaust gas temperature. Though the exhaust gas temperature is determined by the operation states such as the engine rotation speed, even if the engine rotation speed and the like are the same, the exhaust gas temperature also changes when the ignition timing changes. Thus, by including the ignition timing into the parameters for estimating the exhaust gas temperature, the estimation accuracy of the exhaust gas temperature can be enhanced.

Second Embodiment

A description is now given of a second embodiment.

A system to which this embodiment is applied is the same as that of the first embodiment and the calculation for acquiring the scavenging rate is basically the same as that of FIG. 2, but how to acquire the transient exhaust air pressure variation read by the transient-exhaust-gas-pressure-variation read module 203 of FIG. 2 is different.

Figure 8:
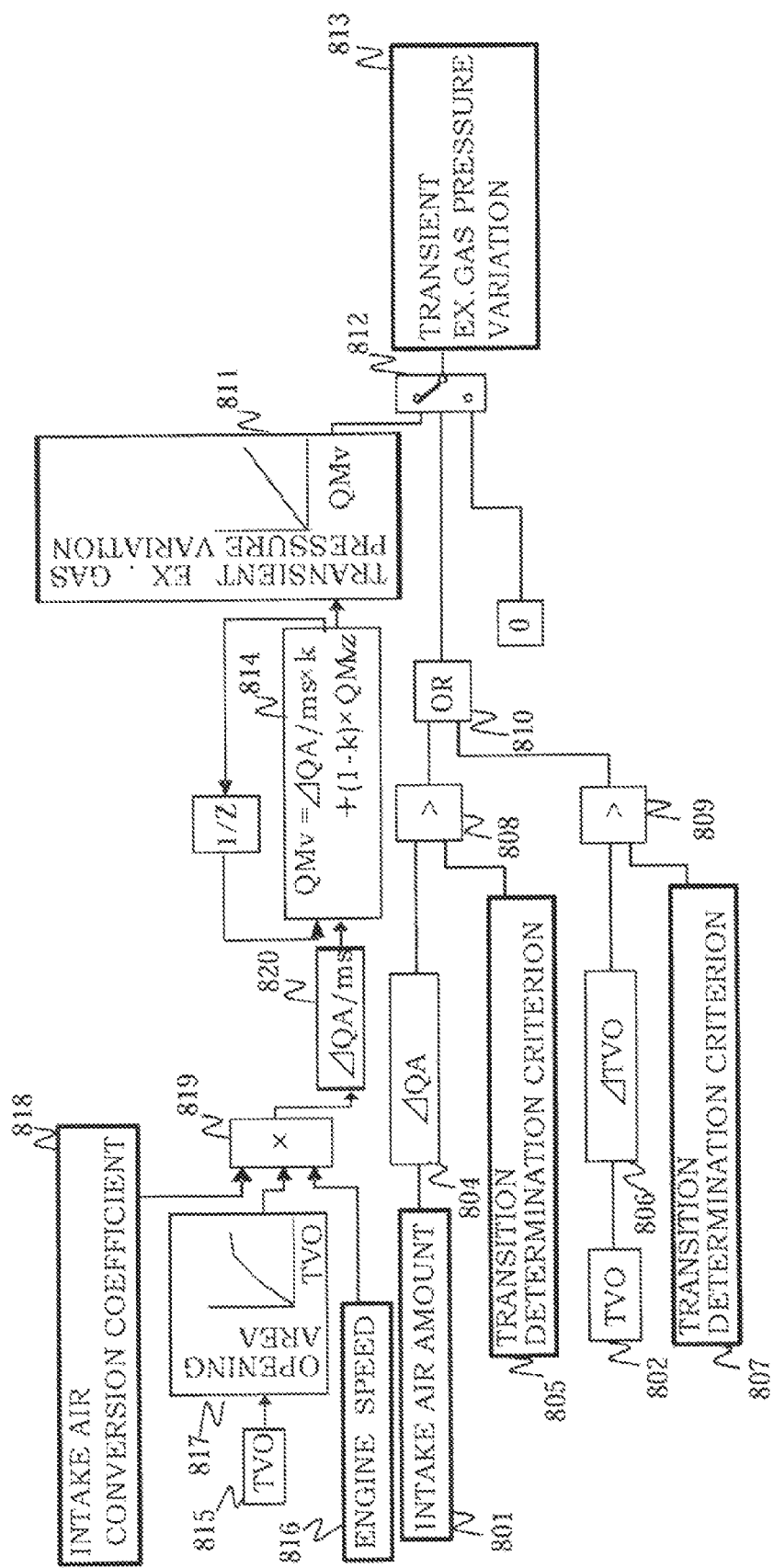
FIG. 8 is a block diagram illustrating details of calculation for acquiring the transient exhaust gas pressure variation carried out by the control unit according to the second embodiment.

FIG. 8 is a block diagram illustrating details of calculating the transient exhaust gas pressure variation according to this embodiment. A different point from the calculation of FIG. 5 is how to calculate the intake air change speed $\Delta QA/ms$, and hence a description is given of only this point.

In FIG. 5, the intake air change speed calculation module 503 calculates the intake air change speed based on the intake air amount, but in FIG. 8, the intake air change speed is calculated as described below.

A throttle opening read module 815 reads the opening of the throttle valve 4 determined based on the detected value obtained by the accelerator opening degree sensor 13. Then, an opening area conversion module 817 calculates a throttle opening area corresponding to the opening of the throttle valve 4, namely, an opening area of the intake passage of the throttle valve 4 installed portion. On this occasion, a table which assigns the throttle opening area with the throttle opening as illustrated in FIG. 8 is used.

The engine rotation speed read module 816 reads the engine rotation speed.

The intake air amount calculation module 819 calculates an intake air amount per cycle by using the throttle opening area and the engine rotation speed, and further using an intake air conversion coefficient read by an intake air conversion coefficient read module 818.

Based on the intake air amount calculated in this way, the intake air change speed calculation module 820 calculates the intake air change speed $\Delta QA/ms$. Specifically, the intake air change speed calculation module 820 calculates a difference between the intake air amount calculated upon the previous calculation, and the intake air amount calculated this time.

As described above, when the transient exhaust gas pressure variation is calculated, the change speed of the intake air amount may be calculated based on the opening of the throttle valve 4 and the engine rotation speed.

As described above, also according to this embodiment, the following effect is provided in addition to the effects of the first embodiment.

The control unit 12 uses the change speed of the throttle valve opening area as the action state of the supercharger 5. Whether the supercharger 5 is in the equilibrium state or the transient state is determined by the air amount passing through the compressor 5a of the supercharger 5. Thus, by using the change speed of the throttle valve opening area controlling the air amount, the action state of the supercharger 5 can be properly recognized.

Though a description has been given of the embodiments of this invention, the embodiments describe only a part of application examples of this invention, and are not intended to limit the technical scope of this invention to the specific configurations of the above-mentioned embodiments.

This application claims priority from Japanese Patent Application No. 2011-24144, filed on Feb. 7, 2011 in the Japan Patent Office, the entire disclosure of which is incorporated herein by reference.

The invention claimed is:

1. A control device for an internal combustion engine equipped with a supercharger, comprising:
   operation state detection unit configured to detect an operation state of the internal combustion engine;
   overlap read unit configured to read a valve overlap period;
   collector pressure detection unit configured to detect a collector pressure;

exhaust gas pressure estimation unit configured to estimate an exhaust gas pressure on an upstream side of the supercharger; and scavenging amount estimation unit configured to estimate a scavenging amount based on the operation state, the valve overlap period, the collector pressure, and the exhaust gas pressure, wherein the exhaust gas pressure estimation unit comprises:

a steady exhaust gas pressure estimation module for estimating an exhaust gas pressure in a steady operation state based on the operation state of the internal combustion engine; and a transient-exhaust-gas-pressure-variation amount estimation module for estimating an exhaust-gas-pressure-change amount in a transient operation state based on the operation state of the internal combustion engine, wherein the exhaust gas pressure estimation unit estimates the exhaust gas pressure by correcting an estimated value of the exhaust gas pressure in the steady operation state by an estimated value of the exhaust-gas-pressure-change amount in the transient operation state, and wherein the transient-exhaust-gas-pressure-variation amount estimation module estimates the exhaust-gas-pressure-change amount in the transient operation state by considering a pressure loss of the supercharger based on a change speed of an intake air amount or a throttle valve opening area.

2. The control device for an internal combustion engine equipped with a supercharger according to claim 1, wherein the exhaust gas pressure estimation unit uses at least an exhaust gas temperature and an ambient pressure as parameters for estimating the exhaust gas pressure in the steady state.

3. The control device for an internal combustion engine equipped with a supercharger according to claim 1, wherein the steady exhaust gas pressure estimation module estimates an exhaust gas temperature based on the operation state of the internal combustion engine, and estimates the exhaust gas pressure in the steady operation state based on an estimated value of the exhaust gas temperature.

4. The control device for an internal combustion engine equipped with a supercharger according to claim 1, wherein the steady exhaust gas pressure estimation module uses an ignition timing retarded amount as one of parameters representing the operation state to estimate the exhaust gas temperature.

5. A control device for an internal combustion engine equipped with a supercharger, comprising:

operation state detection means for detecting an operation state of the internal combustion engine;

overlap read means for reading a valve overlap period;

collector pressure detection means for detecting a collector pressure;

exhaust gas pressure estimation means for estimating an exhaust gas pressure on an upstream side of the supercharger; and scavenging amount estimation means for estimating a scavenging amount based on the operation state, the valve overlap period, the collector pressure, and the exhaust gas pressure, wherein the exhaust gas pressure estimation means comprises:

a steady exhaust gas pressure estimation module for estimating an exhaust gas pressure in a steady operation state based on the operation state of the internal combustion engine; and a transient-exhaust-gas-pressure-variation amount estimation module for estimating an exhaust-gas-pressure-change amount in a transient operation state based on the operation state of the internal combustion engine, wherein the exhaust gas pressure estimation means estimates the exhaust gas pressure by correcting an estimated value of the exhaust gas pressure in the steady operation state by an estimated value of the exhaust-gas-pressure-change amount in the transient operation state, and wherein the transient-exhaust-gas-pressure-variation amount estimation module estimates the exhaust-gas-pressure-change amount in the transient operation state by considering a pressure loss of the supercharger based on a change speed of an intake air amount or a throttle valve opening area.

* * * * *